United States Patent [19]

Peyton

[11] 4,324,135
[45] Apr. 13, 1982

[54] SPEED INDICATOR FOR FISHING GEAR

[76] Inventor: Ralph B. Peyton, 18511-67th W., Lynnwood, Wash. 98036

[21] Appl. No.: 120,841

[22] Filed: Feb. 12, 1980

Related U.S. Application Data

[63] Continuation-in-part of Ser. No. 28,004, Apr. 9, 1979, abandoned.

[51] Int. Cl.³ .............................................. G01C 21/10
[52] U.S. Cl. ........................................ 73/187; 367/148
[58] Field of Search ............ 73/187, 184, 185, 194 B, 73/229, 181; 367/148, 142; 116/27

[56] References Cited

U.S. PATENT DOCUMENTS 3,824,854  7/1974  Weinstein ............................. 73/185
4,159,644  7/1979  Svala ................................... 73/187

Primary Examiner—Donald O. Woodiel
Attorney, Agent, or Firm—Ward Brown; Robert W. Beach

[57] ABSTRACT

A water speed sensor suspended from a fishing boat at the depth fishing gear is being trolled actuates an underwater transducer to transmit a sonic signal detected by an underwater transducer mounted on the boat. The output of the transmitter transducer is fed to an averaging detector circuit which triggers a display of the average speed over a predetermined period of the speed sensed by the speed sensor relative to surrounding water at the trolling depth.

33 Claims, 9 Drawing Figures

U.S. Patent Apr. 13, 1982 Sheet 1 of 3 4,324,135
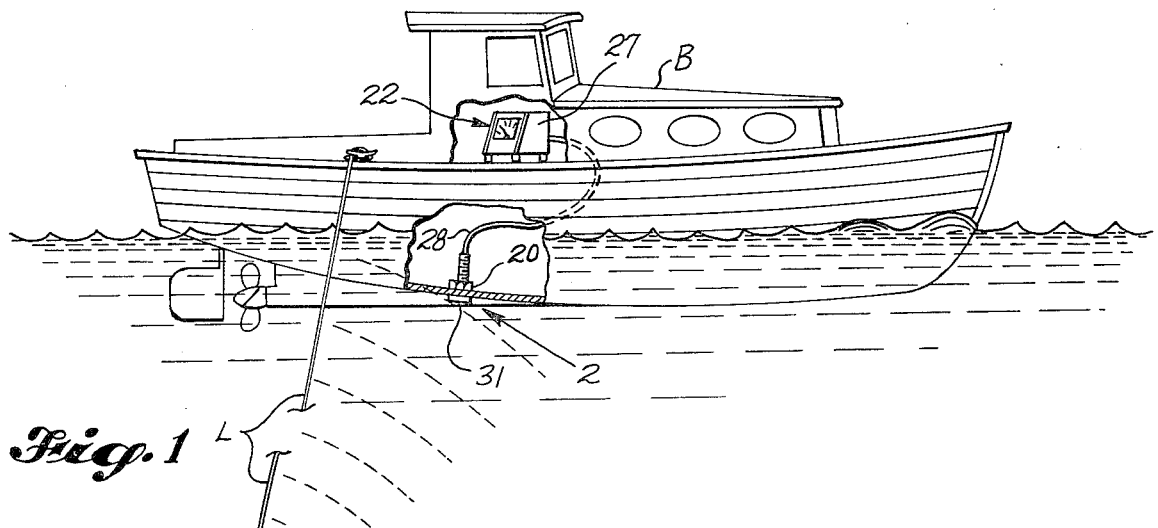
Fig. 1
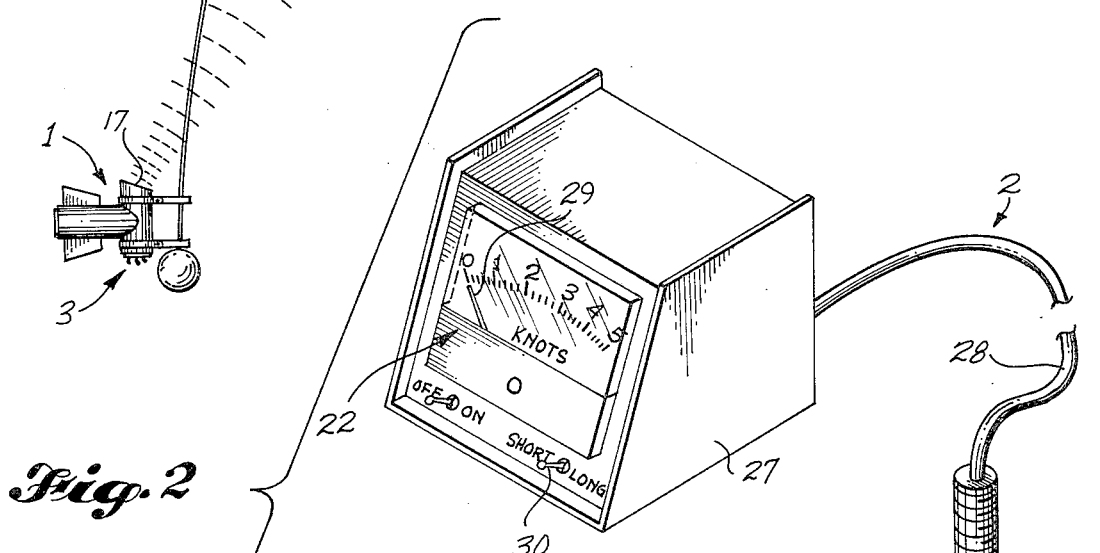
Fig. 2
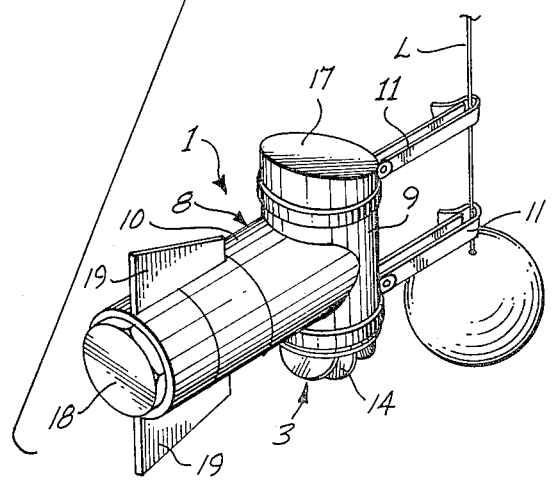
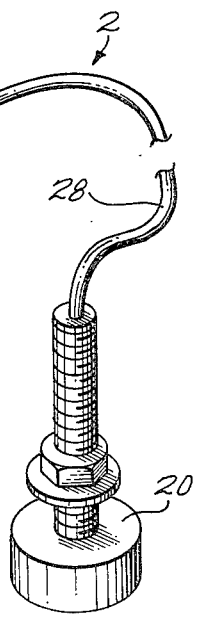

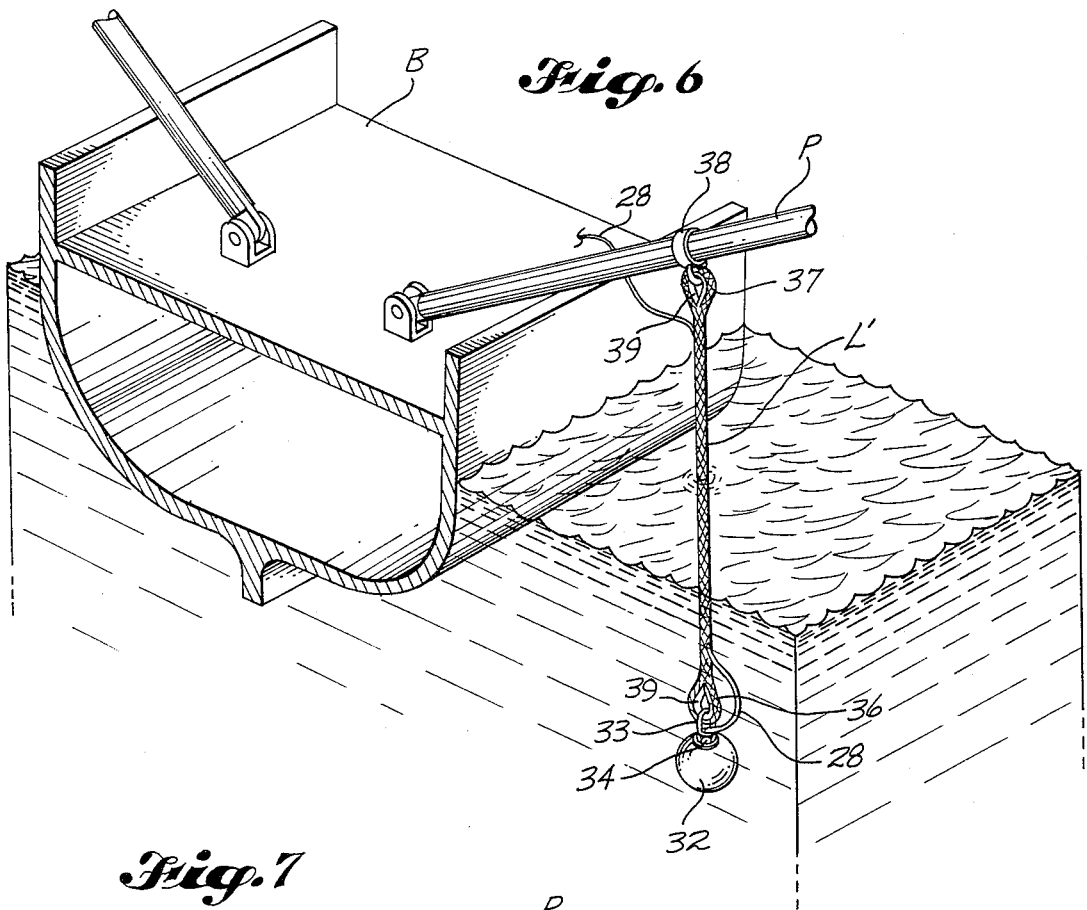
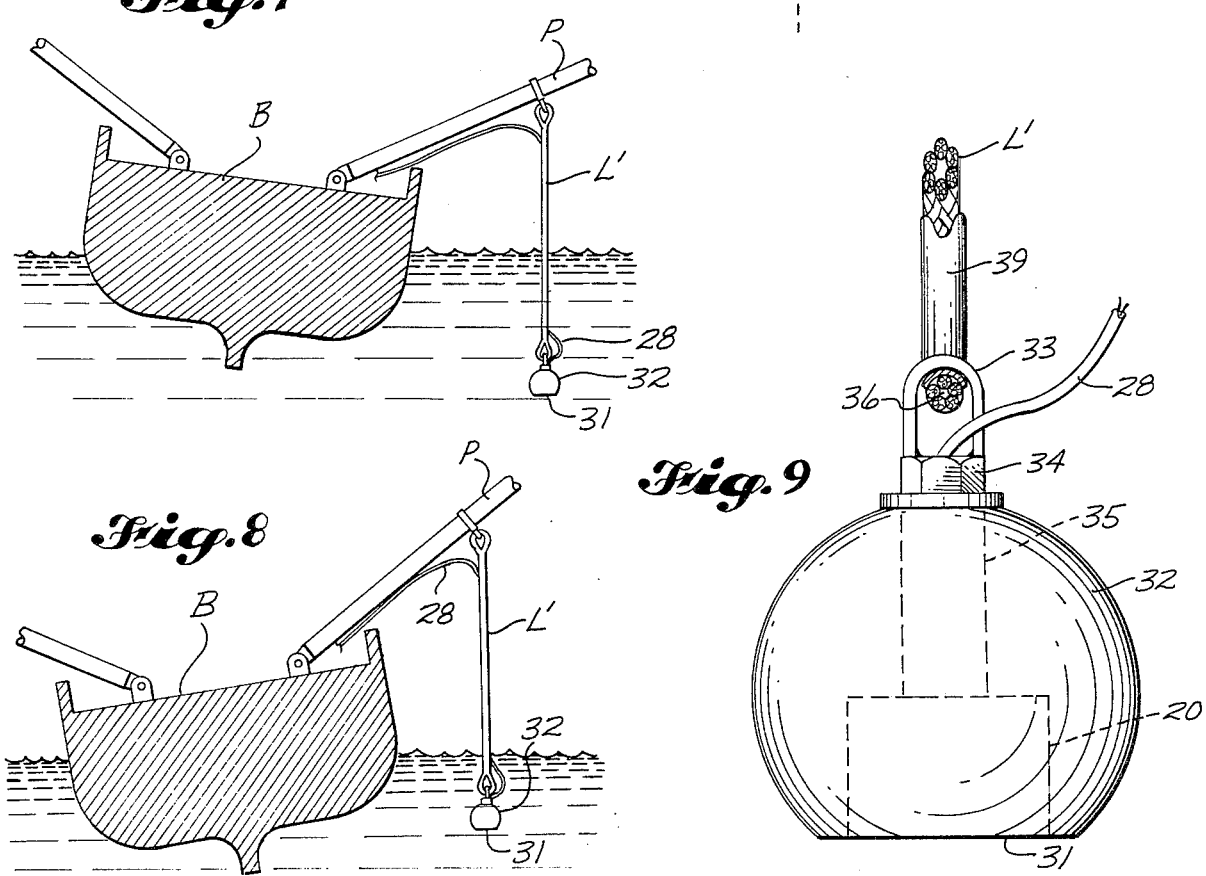

SPEED INDICATOR FOR FISHING GEAR

CROSS REFERENCE

This application is a continuation-in-part of my copending application Ser. No. 028,004, filed Apr. 9, 1979 on Speed Indicator for Fishing Gear, now abandoned.

BACKGROUND OF THE INVENTION

1. Field of the Invention

The present invention relates to a method of and mechanism for indicating the speed of fishing gear trolled by a fishing boat relative to surrounding water at the trolling depth.

2. Prior Art

It is known that the fish-attracting effectiveness of bait, either natural bait or artificial lures, trolled through water varies greatly with the "trolling speed", that is, the speed of the bait relative to surrounding water at the trolling depth. If the bait is trolled too fast or too slow, the "action" of the bait is incorrect for optimum attraction of fish. The optimum range of trolling speeds varies with the bait being used and also with the species of fish to be attracted. For some species, such as Chinook salmon, few fish are attracted if the trolling speed is outside of a very narrow range.

Up to now, determination of the actual trolling speed at the trolling depth has been largely a matter of guesswork. Some fishermen rely entirely on the speeds of their fishing boats relative to surface water in their attempts to set the actual trolling speed at an optimum rate. Others attempt to gauge trolling speed by the angles of their weighted fishing lines, or the tag lines to which their fishing lines are attached, relative to their fishing boats, taking into consideration the amount of weight being used to maintain the bait at a desired depth. Others merely vary boat speed until a fish is caught and then either try to maintain about the same boat speed or continue varying boat speed.

Experienced fishermen recognize that actual trolling speed is affected by surface currents, subsurface currents, tidal action, wave action and wind, and that, consequently, boat speed or fishing line angle are poor indicators of actual trolling speed. Such experienced fishermen usually try to maintain about the same boat speed or fishing line angle that previously has produced good results in the same location under similar conditions, or totally ignore boat speed and fishing line angle and instead rely on their "feel" of the action of the bait or lures.

Maintaining correct trolling speed is particularly important when bait is trolled deep and/or slowly. For example, for Chinook salmon fishing bait is trolled at various depths up to 90 fathoms and the difference between water speed on the surface and at any depth below even 5 or 10 fathoms often is large. In addition, some lures for Chinook salmon fishing are designed to be trolled between a minimum and maximum speed separated by about 0.3 or 0.5 knot, usually within the range of 1.5 knots to 4.0 knots. Such accuracy is impossible to maintain at such slow trolling speeds if the skipper does not know the actual water conditions at the trolling depth.

EXPLANATORY MATERIAL

*McGraw-Hill Encyclopedia of Science and Technology*, 3rd Edition (1971), contains discussions of the following subjects at the volumes and pages indicated:
"Underwater Sound", Vol. 14, pp. 218–222;
"Underwater Telephone", Vol. 14, p. 222;
"Transducer, Underwater", Vol. 14, pp. 26–27;
"Clipping Circuit", Vol. 3, pp. 215–216;
"Integrating Detector", Vol. 5, p. 559
"Smoothing (averaging, integrating) filter", Vol. 5, p. 290.

SUMMARY OF THE INVENTION

It is an object of the present invention to provide a method of accurately and precisely measuring and indicating the speed of fishing gear being trolled by a fishing boat relative to surrounding water at the trolling depth.

It also is an object to practice such method with mechanism which is of simple, compact and inexpensive design and easy to use and store.

The foregoing objects can be accomplished by positioning a water speed sensor at the trolling depth for detecting the speed of such sensor relative to surrounding water, generating a signal of such relative speed and effecting transmission of such signal through the water, receiving such transmitted signal at the boat and using such received signal to trigger a display of such relative speed.

Mechanism for practicing the above method includes a transmitter unit disposable underwater and including the water speed sensor and the signal-generating mechanism, and a receiver unit mountable on or located adjacent to the fishing boat and including the signal-receiving mechanism and a display.

In the preferred embodiment of the invention, the transmitter unit includes mechanism for triggering the display to show the average relative speed detected by the water speed sensor over any one of a plurality of different predetermined periods.

BRIEF DESCRIPTION OF THE DRAWINGS

FIG. 1 is a somewhat diagrammatic side elevation of a speed indicator for fishing gear in accordance with the present invention as used on a fishing boat, parts being broken away.

FIG. 2 is an enlarged top perspective of the transmitter unit and receiver unit constituting such indicator.

FIG. 6 is a diagrammatic fragmentary top perspective of the signal receiving mechanism of the receiver unit showing the preferred mounting of such mechanism on a fishing boat, FIGS. 7 and 8 are corresponding diagrammatic end elevations showing such mounting with the boat in different positions and FIG. 9 is an enlarged fragmentary side elevation of the signal receiving mechanism mounting shown in FIGS. 6, 7 and 8.

DETAILED DESCRIPTION

As shown in FIG. 1, a speed indicator for fishing gear in accordance with the present invention includes a remote transmitter unit 1 trailed under water at the depth the fishing gear is being trolled, such as by attachment to a weighted line L hanging from the fishing boat B trolling the gear; and a receiver unit 2 carried by the boat. In general, transmitter unit 1 sends a sonic signal through the water corresponding to the speed of the transmitter unit relative to surrounding water at the trolling depth, and receiver unit 2 receives such signal and generates a display of such speed. Consequently, the operator of the fishing boat always knows the actual trolling speed of the fishing gear, that is, the absolute speed of the gear relative to surrounding water at the trolling depth irrespective of the influence on such speed of the action of tides and currents at such depth.

Figure 3:
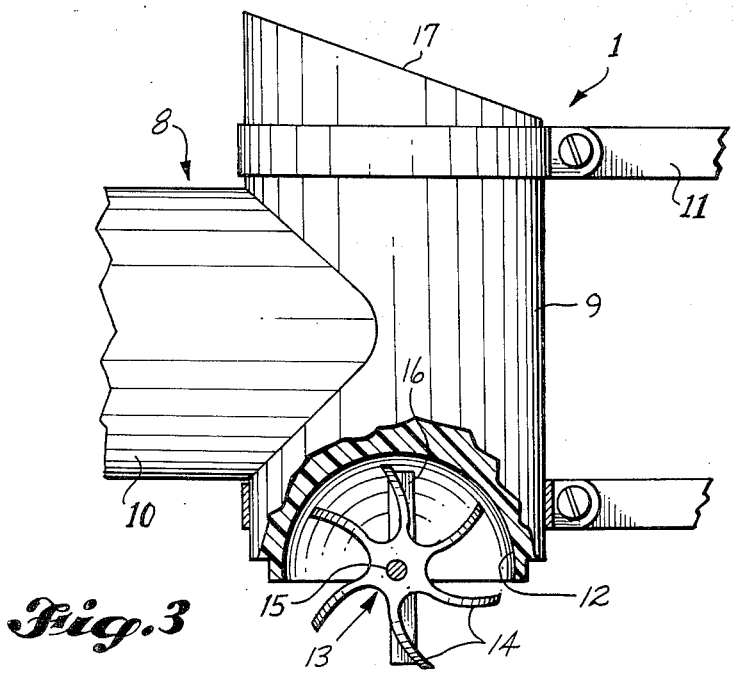
FIG. 3 is a further enlarged fragmentary side elevation of the transmitter unit of such indicator with parts broken away.
Figure 4:
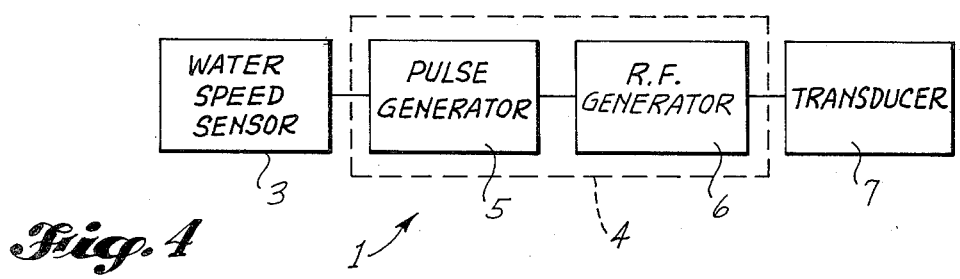
FIG. 4 is a block circuit diagram of the transmitter unit of such indicator.

As illustrated in FIG. 4, the transmitter unit 1 includes a water speed sensor 3 which may be any type of water speed sensor but preferably is a rotatable mechanical water speed responsive device such as a paddle wheel or propeller shown in FIG. 3. Electrical mechanism 4, indicated diagrammatically in FIG. 4, generates a first electrical signal corresponding to the relative speed detected by the water speed sensor. In the preferred embodiment, such electrical mechanism includes a pulse generator 5 producing electrical pulses at a repetition rate or frequency controlled by the speed of the mechanical water speed sensor and a pulsed oscillator, which preferably is a radio-frequency generator 6, driven recurrently by the pulses. Signal-transmitting mechanism 7, namely an underwater transducer acting as a projector, converts the first electrical signal to a corresponding underwater sonic signal.

The preferred transmitter unit shown in FIGS. 2 and 3 includes a watertight housing 8 having a cylindrical front portion 9 arranged with its axis extending vertically and a cylindrical tail portion 10 arranged with its axis extending horizontally and projecting rearward from about the elevational center of the front portion 9. Two elevationally spaced attachment clips 11 for releasably attaching the transmitter unit to line L project forward from housing portion 9.

As shown in FIG. 3, the vertically-extending front housing portion 9 has a hemispherically concave recess 12 opening at the bottom of such housing portion. A small paddle wheel 13 having generally radially projecting blades 14 is mounted on a shaft 15 for rotation. The axis of that shaft extends transversely of the transmitter unit. The opposite shaft end portions are received in opposite sides of housing recess 12. The periphery of each blade is generally circular so that the blades are shaped complementally to the housing recess. Two of the blades 14 projecting substantially directly opposite each other from shaft 15 carry permanent bar magnets 16 for conjoint rotation with such blades.

The lower blades of the paddle wheel project out of the housing recess 12 in the path of water flowing past the transmitter unit as it is trolled, whereas the upper blades 14 are closely received in the recess. The tip portion of each blade 14 is curved so that such tip projects forward toward oncoming water when the blade is in its lower position. The lower blades of the paddle wheel catch water flowing past the transmitter unit, effecting rotation of the paddle wheel at a speed controlled by the speed of movement of the transmitter unit relative to surrounding water.

Other than the magnets 16 rotated with the paddle wheel, all of the electrical mechanism 4 for generating the first electrical signal of the speed detected by the paddle wheel is sealed inside the core of the hollow front housing portion 9. In the preferred embodiment of the invention, the pulse generator 5 includes a magnet-actuated element closely adjacent to recess 12 for detecting movement of a magnet 16 past such element and triggering generation of an electrical pulse. For example, the magnet-actuated element can be a magnetically actuated proximity switch connected to a battery. Each time a magnet moves past the switch, the switch closes for an instant, connecting the battery to the circuit and thereby generating a short pulse having an amplitude equal to the battery voltage. Consequently, the pulse repetition frequency is directly proportional to the speed of rotation of the paddle wheel which, in turn, corresponds to the speed of movement of the transmitter unit relative to surrounding water.

The pulses generated by the pulse generator 5 drive the radio-frequency generator 6, which acts as a pulsed oscillator in that it provides no output except while driven by a pulse from the pulse generator. The output of the radio-frequency generator is a series of short, substantially uniform radio-frequency pulses, that is, "bursts" of radio-frequency energy, the repetition rate or frequency of the radio-frequency pulses or bursts being the same as the repetition frequency of the pulses from the pulse generator. The duration of each radio-frequency burst can be about ½ millisecond.

The output of the radio-frequency generator drives the underwater transducer 7 to effect transmission of a corresponding sonic signal through the water. The vibrating diaphragm 17 of the transducer is located at the top of housing portion 9 and is angled upward and forward for directing the sonic signal toward the fishing vessel.

The power supply, such as a battery or batteries, for the pulse generator, radio-frequency generator and transducer is carried in the housing tail portion 10. The rear end of the tail portion has a watertight cap 18 which is removable for access to the power supply. Fins 19 projecting vertically upward and downward from the tail portion, substantially perpendicular to the axis of the paddle wheel shaft 15, provide directional stability for the speed sensor, deter oscillation or vibration of the transmitter unit as it is trolled through the water and ensure that the broad faces of the downward projecting paddle wheel blades are presented to oncoming water.

Figure 5:
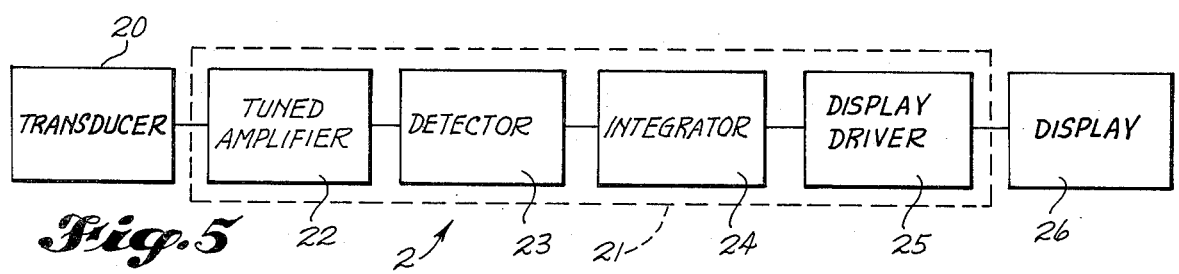
FIG. 5 is a block circuit diagram of the receiver unit of such indicator.

As illustrated in FIG. 5, the receiver unit 2 includes signal-receiving mechanism 20, namely an underwater transducer acting as a hydrophone, which converts the sonic signal transmitted by the transmitter unit 1 to a second electrical signal having characteristics corresponding to the relative speed detected by the water speed sensor, identical or nearly identical to the first electrical signal generated by electrical mechanism 4. Accordingly, the output of the underwater transducer 20 is a series of radio-frequency pulses or bursts having a repetition frequency equal to the repetition frequency of the pulse signal generated by the pulse generator 5. Electrical mechanism 21, in the nature of an average or integrating detector, demodulates such second electrical signal and actuates a display 26 indicating such relative speed.

In the preferred embodiment, electrical mechanism 21 includes an amplifier 22 tuned to the carrier frequency, that is, the frequency of the radio-frequency energy generated by the radio-frequency generator 6. The output of amplifier 22, still a series of spaced, substantially uniform, widely spaced bursts of radio-frequency energy, is fed to a detector 23 for converting the radio-frequency bursts back to a pulse signal, that is, a series of constant amplitude, substantially uniform pulses corresponding to the pulse signal generated by the pulse generator 5. For example, the detector can include a half-wave rectifier, or a clipping amplifier acting as a half-wave rectifier, so that the positive or negative voltage portion of each amplified radio-frequency burst is clipped; and a monostable (one-shot) multivibrator triggered by the output of the rectifier to generate a single constant amplitude pulse for each rectified radio-frequency burst. Each pulse generated by the multivibrator has the same duration, preferably at least several milliseconds. The pulse repetition frequency of the uniform pulses generated by the multivibrator is the same as the pulse repetition frequency of the radio-frequency bursts generated by the radio-frequency generator 6, which is the same as the pulse repetition frequency of the pulses generated by the pulse generator 5, which corresponds to the speed of rotation of the paddle wheel 13.

The output of detector 23 is fed to an averaging circuit or integrator 24, which can be a simple resistor-capacitor averaging or integrating filter. The time constant or averaging period of the integrator is long enough to encompass several pulses and, consequently, the voltage of the output of the integrator is substantially directly proportional to the pulse repetition frequency of the pulse signal from the detector 23. For example, for a high frequency detector pulse output, corresponding to fast movement of the transmitter unit 1 relative to surrounding water, a greater number of pulses will occur during the averaging period than for a lower frequency detector pulse output, corresponding to slower movement of the transmitter unit relative to surrounding water. The result is that the output voltage of the integrator is a signal of the average speed of the transmitter unit relative to surrounding water in that such output voltage is proportionately higher for a high pulse repetition frequency, that is, for fast movement of the transmitter unit, than for a lower pulse repetition frequency, that is, for proportionately slower movement of the transmitter unit.

The signal of average speed from the integrator is fed to a display driver 25, such as an amplifier, which triggers the voltage responsive display 26 to indicate the speed of the transmitter unit relative to surrounding water at the trolling depth. Such display can be an electronic digital display or, as shown in the drawings, can have a mechanical indicator, such as a swinging needle 29. In either case, the display acts as a voltmeter showing the speed of movement of the transmitter unit that corresponds to the amplified voltage output of the display driver 25.

Averaging the relative speed detected by the water speed sensor over a period of substantial length reduces hunting of the speed-indicating needle or digital readout inaccuracies resulting from abrupt changes in the relative speed of the transmitter unit, which may be caused by irregular currents, wave action or gusts of wind. Preferably the length of the predetermined averaging period is adjustable by the operator of the fishing vessel. A short averaging period is selected for calm conditions so that a substantially instantaneous reading of actual trolling speed is obtained, whereas in violent or irregular conditions a smooth, generally uniform reading still is obtained by increasing the averaging period.

A switch 30 on the display unit can be provided for the averaging circuit or integrator 24 to control the length of the averaging period. For example, for one setting of the switch, the "short" setting, the averaging period is about six seconds, whereas for another setting of the switch, the "long" setting, the averaging period is about fifteen seconds. Where the integrator is a simple resistor-capacitor averaging filter, manipulation of the switch can simply connect one or the other of two resistors or capacitors to the other filter component to set the time constant at an appropriate value. Alternatively, an infinitely variable switch mechanism could be provided for setting the averaging period to be any duration between, for example, three seconds and sixty seconds, such as by use of a potentiometer in a simple resistor-capacitor averaging filter.

As shown in FIGS. 1 and 2, the underwater transducer 20 of the receiver unit can be mounted beneath the boat hull with its receiving diaphragm 31 angled downward and rearward toward the oncoming sonic signal transmitted by the transmitter unit. Electrical mechanism 21 can be mounted in the housing 27 for the display 22 and connected to the transducer by an electrical cable 28. However, mounting the receiver transducer 20 stationarily relative to the boat results in the receiving diaphragm 31 rocking and pitching with the boat, changing the angle of such diaphragm relative to the sonic signal transmitted by the diaphragm 17 of the transmitter transducer. Since most underwater transducers are at least somewhat direction sensitive, the alternative mounting of the receiver transducer to the boat shown in FIGS. 6 through 9 is preferred.

In the preferred mounting of the receiver transducer 20 on a fishing boat B shown in FIGS. 6 through 9, such transducer is carried inside a weight 32, such as a twelve pound (5.4 kilogram) lead ball, with its receiving diaphragm 31 exposed at the bottom of the weight. The upward projecting loop 33 of a bail 34 that is carried by the weight, such as by being screwed onto the threaded upward projecting transducer shaft 35, is received in the lower end loop 36 of a line L' having its upper end loop 37 connected to a pole P by a bracket 38. Such pole can be a trolling pole projecting outward from a side of the boat. The inner peripheries of end loops 36 and 37 are reinforced by metal straps 39. Preferably line L' is a hollow braided line so that the transmission cable 28 extending from the transducer to the display unit can be threaded loosely through substantially the full length of the line as shown in FIG. 6.

As shown diagrammatically in FIGS. 8 and 9, as the fishing boat rocks or pitches, line L' carrying the weight 32 and the receiving transducer 20 moves up and down and slightly toward and away from the adjacent side of the hull of the fishing boat, but remains substantially vertical. Consequently, the receiving diaphragm 31 of the transducer always is pointed substantially directly downward, that is, at a substantially constant angle to the sonic signal from the transmitter unit.

Preferably line L' is carried by pole P a sufficient distance outward from the side of the hull of the fishing boat that the weight 32 carrying the receiver transducer will not bounce against such hull side as the boat rocks. In addition, the length of line L' should be sufficient that the signal-receiving diaphragm 31 of the receiver transducer always is located a substantial distance under water. In a representative installation, line L' is connected to pole P about 3 to 6 feet (0.9 meters to 1.8 meters) outward from the adjacent side of the boat hull and the length of line L' is sufficient that, at rest, the transducer signal-receiving diaphragm is positioned at least about 3 feet (0.9 meters) under water.

The display of the receiver unit can be permanently mounted on the fishing boat. When not in use, the compact transmitter unit can be stowed in any convenient location. Since no bulky and expensive cables or wires are required to connect the two units, the speed indicator for fishing gear of the present invention can be put into use quickly and easily by clipping the transmitter unit to a line hanging from the fishing vessel, lowering the line to position the transmitter unit at the trolling depth and lowering the receiver transducer if it is not permanently mounted in the hull.

I claim:

1. The method of measuring the trolling speed of fishing gear being trolled by a fishing boat which comprises positioning a water speed sensor at approximately the trolling depth for detecting the speed of such sensor relative to surrounding water, generating a first electrical signal of such speed detected by the water speed sensor, converting such first electrical signal to a sonic signal of such speed for effecting transmission of such sonic signal through the water, receiving such transmitted sonic signal at the boat, converting such received sonic signal to a second electrical signal of such speed, and actuating a display of such speed at the boat by such second electrical signal.

2. The method defined in claim 1, including actuating a display of the average speed detected by the water speed sensor over a predetermined period.

3. The method defined in claim 2, including actuating a display of the average speed detected by the water speed sensor over any selected one of a plurality of different predetermined periods.

4. The method defined in claim 1, including positioning at approximately the trolling depth a remote transmitter unit having the water speed sensor, such transmitter unit including a housing and the water speed sensor being movable relative to the housing at a speed controlled by the speed of the transmitter unit relative to surrounding water, and generating the first electrical signal of such speed of the transmitter unit by generating electrical pulses at a repetition frequency substantially proportional to the speed of the water speed sensor relative to the housing.

5. The method defined in claim 4, including generating radio-frequency pulses at a repetition rate substantially proportional to the speed of the water speed sensor relative to the housing and effecting transmission of a corresponding sonic signal through the water.

6. The method defined in claim 4 or 5, including converting the received sonic signal to the second electrical signal by converting the sonic signal to an electrical pulse signal having a pulse repetition frequency directly proportional to the speed of the water speed sensor relative to the housing, and including averaging such electrical pulse signal over an immediately preceding period of predetermined length encompassing at least several pulses for obtaining an electrical signal having an instantaneous voltage substantially proportional to the average speed of the transmitter unit relative to surrounding water during the predetermined period.

7. The method of measuring the trolling speed of fishing gear being trolled by a fishing boat which comprises positioning at approximately the trolling depth by attachment to a line hanging from the boat a remote transmitter unit having a mechanical water speed sensor that rotates at a speed corresponding to the speed of the remote transmitter unit relative to surrounding water, generating an electrical pulse signal having a pulse repetition frequency substantially proportional to the speed of rotation of the water speed sensor, converting such electrical pulse signal to a sonic signal of the speed of rotation of the mechanical water speed sensor for effecting transmission of such sonic signal through the water, receiving such transmitted sonic signal at the boat, converting such received signal to a second electrical pulse signal having a pulse repetition frequency substantially proportional to the speed of rotation of the mechanical water speed sensor, averaging such second electrical pulse signal over an immediately preceding period of predetermined length encompassing at least several pulses for obtaining a varying voltage signal having a voltage substantially proportional to the speed of rotation of the mechanical water speed sensor, and actuating a voltage-responsive display with such varying voltage signal for indicating the speed of the transmitter unit relative to surrounding water at the trolling depth.

8. A speed indicator for fishing gear trolled by a fishing boat comprising:
   a transmitter unit disposable under water and including means for sensing the speed of said transmitter unit relative to surrounding water, means for generating a first electrical signal of the speed sensed by said sensing means and means for converting said first electrical signal to a sonic signal corresponding to such speed to effect transmission of such sonic signal through the water; and
   a receiver unit mountable on the fishing boat and including means for receiving said transmitted sonic signal and for converting said sonic signal to a second electrical signal of such speed and display means actuated by said second electrical signal for displaying such speed.

9. The indicator defined in claim 8, in which the sensing means includes a mechanical water speed sensor rotatable at a speed corresponding to the speed of movement of the transmitter unit relative to water surrounding it, the first electrical signal-generating means including means for generating a first electrical pulse signal having a pulse repetition frequency substantially proportional to the speed of rotation of the mechanical water speed sensor.

10. The indicator defined in claim 9, in which the first electrical signal generating means includes means for generating a radio-frequency pulse signal having a pulse repetition frequency substantially proportional to the speed of rotation of the mechanical water speed sensor.

11. The indicator defined in claim 9 or 10, in which the receiving and converting means includes means for converting the transmitted sonic signal to second electrical pulse signal having a pulse repetition frequency substantially directly proportional to the speed of rotation of the mechanical water speed sensor.

12. The indicator defined in claim 11, in which the receiving and converting means further includes means for averaging the second electrical pulse signal over an immediately preceding period of predetermined length encompassing at least several pulses and thereby generating a varying voltage signal the instantaneous voltage of which is substantially proportional to the average speed of movement of the transmitter unit relative to surrounding water over the predetermined period.

13. The indicator defined in claim 9, the transmitter unit including a housing, the sensing means including a member movable relative to said housing by relative movement of the housing and the surrounding water, and the first electrical signal-generating means including first and second magnetic members carried, respectively, by said movable member and said housing.

14. The indicator defined in claim 13, the movable member being rotatable relative to the housing.

15. The indicator defined in claim 14, the housing having a fin projecting from the housing in a plane substantially perpendicular to the axis of rotation of the rotatable member.

16. The indicator defined in claim 13, the movable member being movable relative to the housing at a speed controlled by the speed of the transmitter unit relative to surrounding water, the first magnetic member being movable repetitively past the second magnetic member by movement of the movable member relative to the housing, and the first electrical signal-generating means including means for generating an electrical pulse each time the first magnetic member moves past the second magnetic member.

17. The indicator defined in claim 16, the first electrical signal-generating means including a radio-frequency generator driven recurrently by the pulse output of the electrical pulse-generating means for generating bursts of radio-frequency energy substantially in synchronism with the pulses generated by the electrical pulse-generating means.

18. The indicator defined in claim 8, in which the receiver unit includes averaging means for receiving the second electrical signal and for actuating the display means to show the average speed sensed by the sensing means over a predetermined period.

19. The indicator defined in claim 18, in which the averaging means includes means for actuating the display means to show the average speed sensed by the sensing means over any selected one of a plurality of different predetermined periods.

20. The indicator defined in claim 8, the transmitter unit including a housing, and the sensing means including a paddle wheel rotatably mounted on the housing.

21. The indicator defined in claim 20, the paddle wheel being rotatable about a generally horizontal axis.

22. The indicator defined in claim 20, the housing having a recess receiving a portion of the paddle wheel.

23. The indicator defined in claim 22, the housing recess closely encircling about one-half of the circumference of the paddle wheel.

24. The indicator defined in claim 22 or 23, the housing recess being generally hemispherical.

25. The indicator defined in claim 24, the paddle wheel including a plurality of generally radially projecting blades, the outer portions of said blades being shaped substantially complementally to the housing recess.

26. The indicator defined in claim 22, the paddle wheel including blades having tip portions disposed in the path of water flowing past the transmitter unit and curved forward toward oncoming water.

27. The indicator defined in claim 22, the housing including a bottom having the recess partially receiving the paddle wheel, and the paddle wheel including blades having tip portions projecting downward below the housing bottom in the path of water flowing past the transmitter unit.

28. The indicator defined in claim 8, in which the receiving and converting means includes a hydrophone mounted stationarily relative to the hull of the fishing boat.

29. The indicator defined in claim 8, in which the receiving and converting means includes a hydrophone, and including means mounting the hydrophone on the fishing boat for movement relative to the fishing boat.

30. The indicator defined in claim 29, in which the mounting means includes a line suspended from the boat and carrying the hydrophone below the water surface.

31. The indicator defined in claim 30, the mounting means including a heavy weight carried at the lower end portion of the line for maintaining the line substantially vertical.

32. The indicator defined in claim 31, in which the weight weighs at least about ten pounds (4.5 kilograms).

33. The indicator defined in claim 31, in which the hydrophone is mounted generally inside the weight but has a signal-receiving diaphragm openly exposed to surrounding water.

* * * * *